No. 806,623. PATENTED DEC. 5, 1905.
W. F. BEASLEY.
RESILIENT TIRE.
APPLICATION FILED FEB. 20, 1903. RENEWED MAY 11, 1905.

Witnesses
Inventor
William F. Beasley
by
his Attorney

UNITED STATES PATENT OFFICE.

WILLIAM F. BEASLEY, OF PLYMOUTH, NORTH CAROLINA.

RESILIENT TIRE.

No. 806,623.  Specification of Letters Patent.  Patented Dec. 5, 1905.

Application filed February 20, 1903. Renewed May 11, 1905. Serial No. 259,957.

*To all whom it may concern:*

Be it known that I, WILLIAM F. BEASLEY, a citizen of the United States of America, and a resident of Plymouth, county of Washington, State of North Carolina, have invented certain new and useful Improvements in Resilient Tires, of which the following is a specification.

In another application filed by me on the 15th day of December, 1902, and serially numbered 135,253, I have shown, described, and broadly claimed a tire for vehicles, resiliency in which is provided for by the use of a resilient section consisting of a sinuous band of rubber inclosed in a wearing-section. My present application relates to a modification of that invention, in which the resilient section consists of a band or of a plurality of sinuous bands, the said section having a plurality of series of notches formed in its opposite surfaces, the notches of the several series being staggered in respect to each other, whereby a resilient section is formed having a supporting-truss at every point around its circumference.

My invention consists in the construction, arrangement, and combination of the several parts of which it is composed, whereby a tire having the features above specified is obtained.

Figure 1:
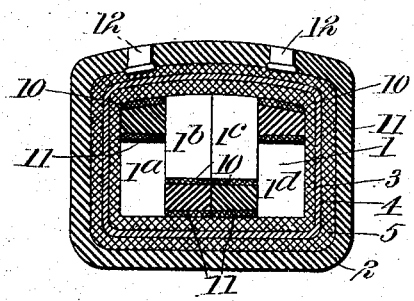
Figure 2:
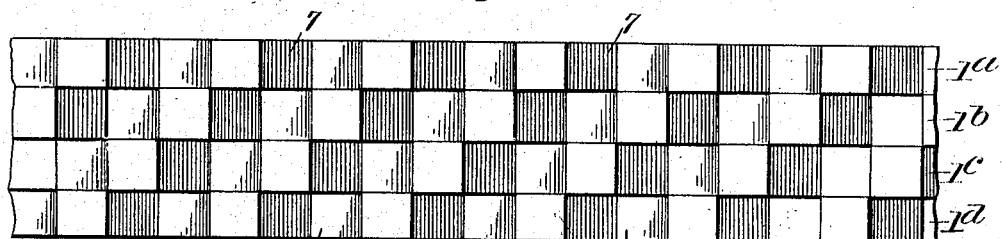
Figure 3:
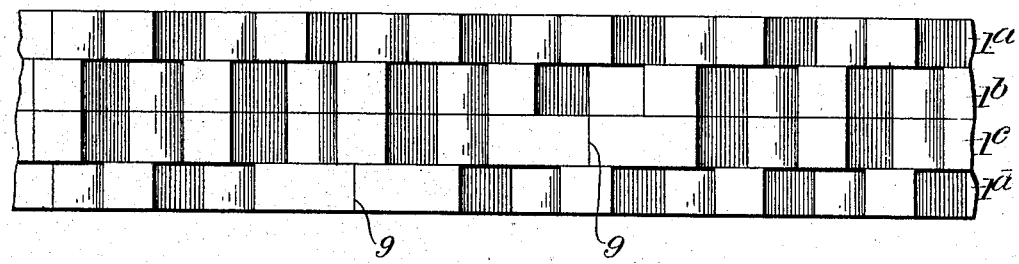
Figure 4:
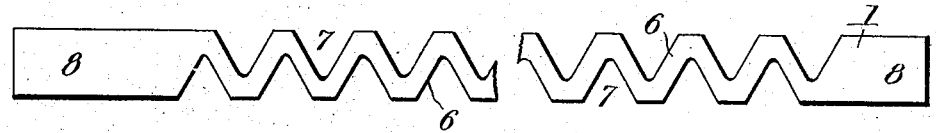

Referring to the accompanying drawings, in which corresponding parts are designated by similar marks of reference, Figure 1 represents a transverse section taken through a tire constructed in accordance with this invention. Fig. 2 is a plan view of the resilient section of such a tire. Fig. 3 represents a modification of the arrangement shown in Fig. 2. Fig. 4 is a side elevation of a single strip of the resilient section.

The tire here described is especially applicable for use with heavy vehicles, and essentially consists of a resilient core or section 1, inclosed in a wearing section or casing 2. As shown, the resilient section may be wrapped with one or more strengthening-wrappers 3, 4, and 5 before being placed in the wearing-casing of the tire; but in so far as concerns the scope of this invention these strengthening-wrappers are unessential and may be dispensed with without departing from the scope hereof.

A resilient section 1 may be composed of a plurality of bands or strips $1^a$ $1^b$ $1^c$ $1^d$, &c., rectangular in cross-section. Each strip or band consists of a series of transverse walls 6, the walls being, by preference, secants to the wheel upon which the tire has to be applied, the adjacent walls being oppositely inclined, whereby the inner end of each transverse wall abuts against the inner end of the adjacent wall on the other side, each core-strip being thus in the form of a sinuous band composed of transverse walls. A strip may be obtained by forming in a suitable mold or otherwise a strip of rubber of the desired cross-section and by cutting in the opposite face thereof wedge-shaped notches 7, the notches in one face being staggered in respect to the notches in the other face, whereby between the adjacent notches the transverse trussed walls 6 will be left. The strip may be either formed straight and afterward bent to fit the perimeter of the wheel or it may be molded directly into the circular shape of the wheel, and instead of forming an unnotched strip and afterward cutting notches therein it is obvious that the strip with transverse walls may be formed at one operation by cutting the proper sinuous strip from a sheet of rubber or rubber composition of the proper thickness. For the purpose of affording solid portions of the full cross-section of the strips to permit a convenient and efficient joint to be made between the ends of the strip I prefer to leave a portion 8 at each end of each strip unnotched.

In assembling a tire in accordance with this invention I place the desired number of strips side by side, the several strips being so arranged that the notches therein are staggered in respect to the notches in the other strips. Thus in Fig. 2 I have shown the notches in the outer strips $1^a$ and $1^d$ staggered in respect to the notches in the medial strips $1^b$ and $1^c$, while the medial strips may be arranged either to have their notches staggered with respect to each other, as in Fig. 2, or coinciding, as shown in Fig. 3, although I prefer the latter arrangement, as thereby the trussed walls of the medial strips reinforce each other, the walls of the outer strips being sufficiently braced by the wearing-casing and the wrappings 3, 4, and 5 when the latter are used. The medial strips $1^b$ and $1^c$ may be made deeper than the side strips, whereby a slight curve will be given to the tire, and, if the several strips are made in any other form than the complete annuli, may be so assembled that their ends break joints with the adjacent strips, as shown at 9 9, Fig. 3, whereby the strips may be assembled in an annulus of practically the same strength, as if formed from a continuous ring. For the purpose of strengthening the trussed walls of the several strips bands of canvas 10 and 11, impregnated with unvulcanized rubber or having strands of rubber worked therein, may be laid on the outer and inner faces, respectively, of each strip and pressed down into the notches thereof, so as to lie close to the trussed walls 6, to which they will be firmly united by the subsequent process of vulcanization, whereby these said walls will be stiffened and strengthened, the canvas taking up the strain caused by the deformation of the walls under pressure.

A resilient section constructed as above described may be inserted in any suitable way in a wearing-section 2 and may be further surrounded by the strengthening-bands 3, 4, and 5 to prevent the side thrust of the resilient section.

A tire constructed in accordance with this invention thus consists of a wearing-section inclosing a resilient section, the two sections, by preference, being united together by vulcanization, for which purpose the several strips forming a resilient core are not completely vulcanized until after their insertion in the wearing-wrapper, whereby upon the final vulcanization of the tire not only will the wearing-section and the resilient section be united together, but likewise the several strips forming a resilient section will also be united by vulcanization, forming a single flat strip having in its inner and outer surfaces a plurality of circumferential series of depressions or notches, the notches in the several series on the same surface of the strip being staggered in respect to each other and the notches in the same series and opposite sides of the strip also being staggered in respect to each other. From this it follows that every short portion of the resilient strip has one or more of a series of apices formed by the abutment of the adjacent ends of the transverse trussed walls whereby each portion of the casing will be supported by a plurality of such walls distributed over the entire surface in contact with the ground, thereby preventing undue distortion and giving uniform resiliency.

For the purpose of reducing the wear on the casing to a minimum I may, if I so desire, insert metallic studs 12 in the tread-wall of the casing at such points as will cause them to be located over the apices of the trusses. These are shown in Fig. 1 and serve to transmit the pressure directly to the trusses.

Having thus described my invention, what I claim, and desire to secure by Letters Patent of the United States, is—

1. A resilient core for a tire consisting of a plurality of sinuous bands of rubber, the apices of the several bands being staggered in respect to each other, substantially as described.

2. A tire consisting of a resilient core formed by a plurality of sinuous bands of rubber, the apices of each band being staggered in respect to each other, and a wearing-section inclosing the resilient core, substantially as described.

3. A resilient core for a tire consisting of a plurality of sinuous bands united together side by side, and so arranged that the apices of the several bands are staggered in respect to each other, substantially as described.

4. A resilient section for a tire consisting of a band of rubber, having on its opposite faces a plurality of circumferential series of depressions, the depressions of one series being staggered with respect to the depressions of the adjacent series on the same face of the tire, and being also staggered in respect to the depressions of the corresponding circumferential series on the other face of the tire, substantially as described.

5. A resilient tire-section formed by a band of rubber having in each of its opposite faces a plurality of circumferential series of notches, substantially as described.

6. A tire consisting of a resilient section formed by a band of rubber having in each of its opposite faces a plurality of circumferential series of notches, and a wearing-section inclosing the resilient section, substantially as described.

Signed by me at Washington, District of Columbia, this 10th day of February, 1903.

WILLIAM F. BEASLEY.

In presence of—
VERNON M. DORSEY,
E. V. HUGHES.